Figure 4:
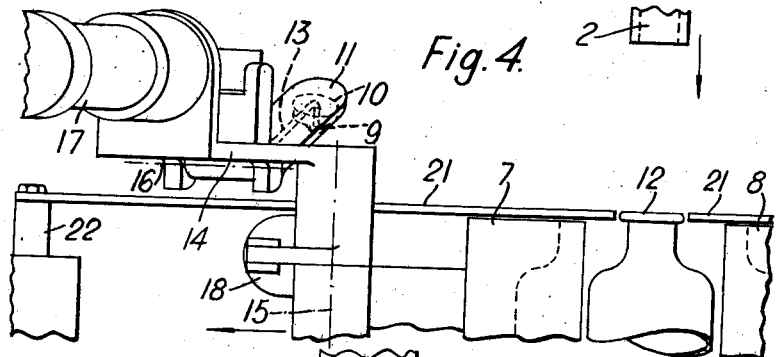

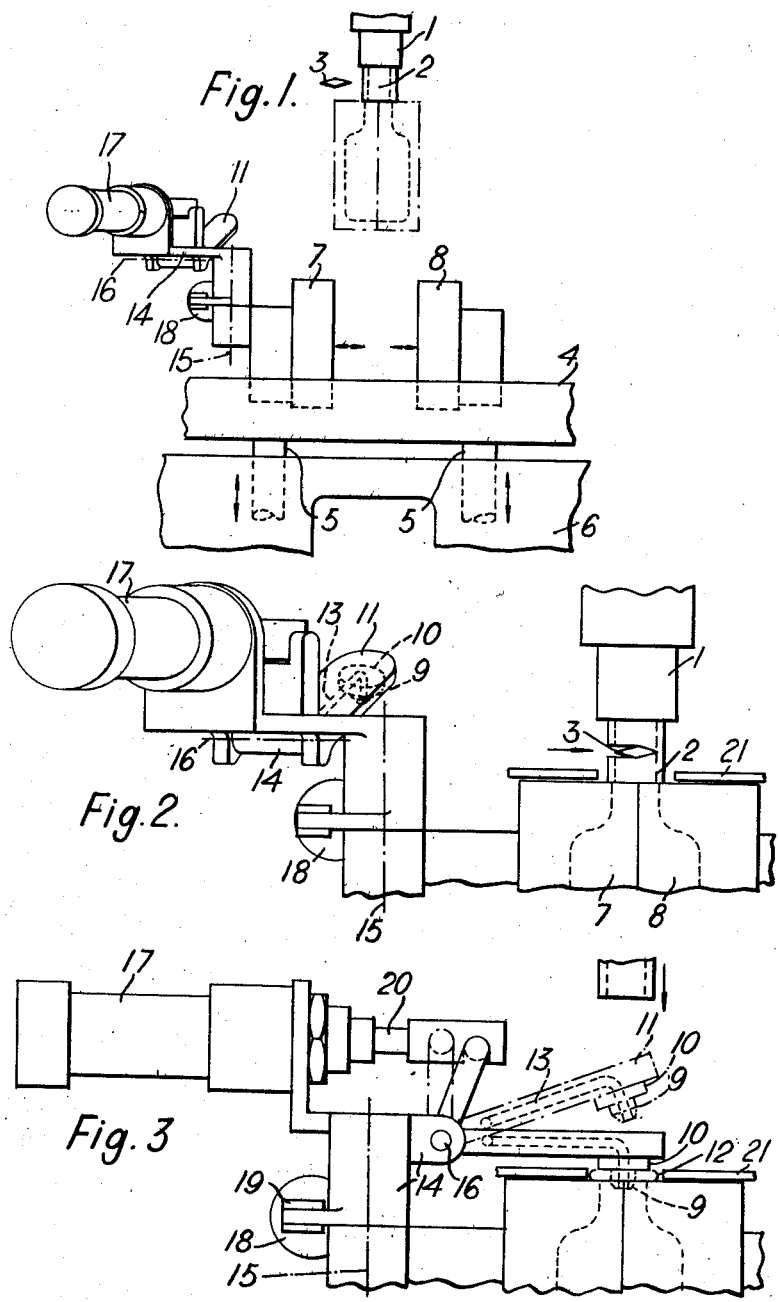

March 19, 1963   J. M. JACKSON ET AL   3,081,489
MANUFACTURE OF HOLLOW ARTICLES FROM THERMOPLASTIC MATERIALS
Filed Jan. 9, 1961   5 Sheets-Sheet 2

JOHN M. JACKSON
KENNETH J. WHITBOURN

*Inventors*

By *Emirie & Smiley*
*Attorneys*

March 19, 1963  J. M. JACKSON ET AL  3,081,489
MANUFACTURE OF HOLLOW ARTICLES FROM THERMOPLASTIC MATERIALS
Filed Jan. 9, 1961  5 Sheets-Sheet 3
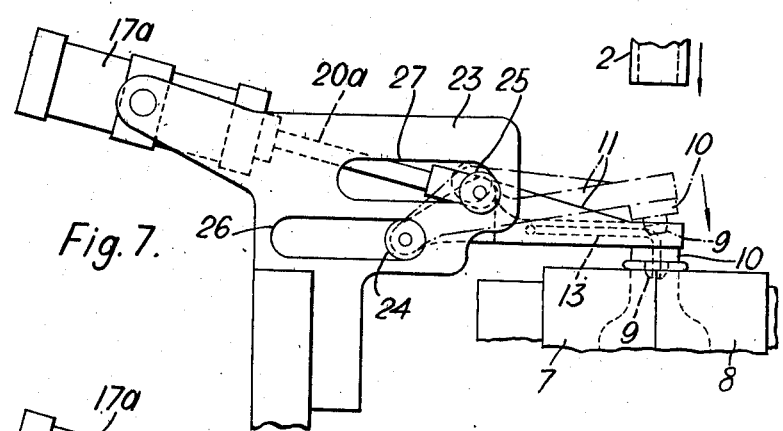
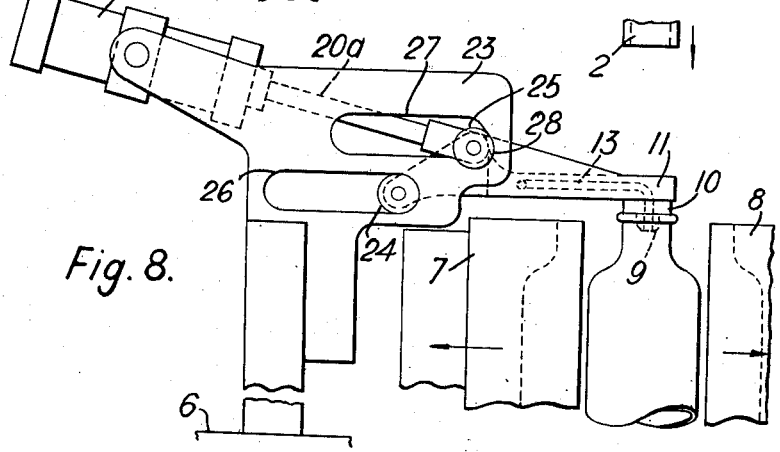
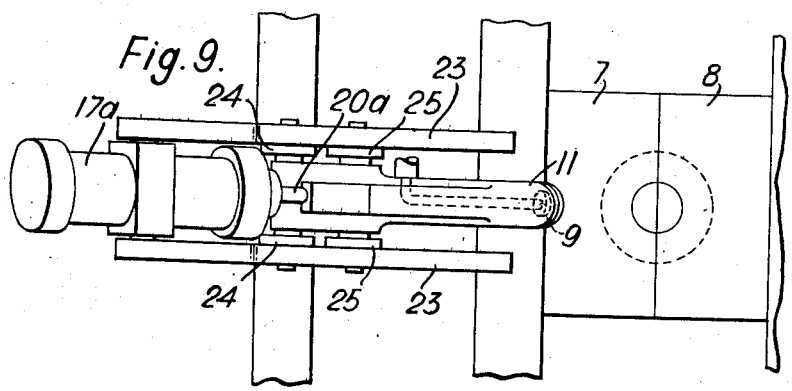
Inventors
JOHN M. JACKSON
KENNETH J. WHITBOURN
By
Attorneys

JOHN M. JACKSON
KENNETH J. WHITBOURN

March 19, 1963   J. M. JACKSON ET AL   3,081,489
MANUFACTURE OF HOLLOW ARTICLES FROM THERMOPLASTIC MATERIALS
Filed Jan. 9, 1961   5 Sheets-Sheet 5

Inventors
JOHN M. JACKSON
KENNETH J. WHITBOURN
By
Attorneys

United States Patent Office 3,081,489
Patented Mar. 19, 1963

3,081,489
MANUFACTURE OF HOLLOW ARTICLES FROM THERMOPLASTIC MATERIALS
John Maxwell Jackson, Potters Bar, and Kenneth Joseph Whitbourn, Watford, England, assignors to The Metal Box Company Limited, London, England, a British company
Filed Jan. 9, 1961, Ser. No. 81,444
Claims priority, application Great Britain Jan. 25, 1960
6 Claims. (Cl. 18—5)

This invention relates to the manufacture of hollow articles, in particular bottles, from thermoplastic materials such as polyethylene, cellulose esters, polyvinyl chloride, or polystyrene, such materials being hereinafter referred to as "plastic material."

In one currently employed method of manufacturing bottles from plastic material, known as an "upside down" method, a length of plastic tube is extruded from an extrusion die in a vertical downward direction and a sectional mould is movable with a reciprocable mould support along the axis of extrusion between a datum position at which the mould is remote from the die and a mould-closing position adjacent to the die and at which the mould sections are moved laterally relative to the mould support to close the die about a length of the extruded tube. Associated with the lower or bottom end of the mould is a blowing nozzle or mandrel which extends into the mould and about which the leading end of the extruded tube is disposed before closing of the mould sections. On closing of the mould sections about a tube length the leading end of the tube is gripped between the blowing nozzle or mandrel and the lower ends of the mould sections to shape the neck of the bottle, and the upper ends of the mould sections grip and close the tube. Following separation of the enclosed tube length from the parent tube fluid, usually air, under pressure, is admitted to tube length to expand it to the shape of the interior of the mould and the mould is returned to the datum position thereof at which, after an appropriate interval to ensure cooling of the bottle, it is opened and the formed article ejected therefrom.

When operating the method just described it is possible to obtain a relatively high rate of output per extrusion die because extrusion of the tube is continuous. The method does, however, result in an unfavourable distribution of plastic material in the formed bottle in that the neck and shoulder portion of the bottle are thick relative to the bottom and side walls of the bottle whereas it is desired that the material distribution be the opposite of that obtained. This disadvantage arises largely from the gravitational forces exerted on the pendant tube before the mould is closed about the tube, it being understood that the leading end portion of the tube is of maximum wall thickness and tends to cool while moving away from the die so that the weight thereof tends to attenuate the tube as it leaves the die in a hot very soft condition. Accordingly, in order to ensure that the bottom and side walls of the bottles particularly the point at which the bottom and side walls meet have an adequate thickness it is necessary to use an excessive quantity of material for each bottle thus considerably increasing the cost thereof.

A further disadvantage of the known upside down method is that the tube must have an internal diameter not less than that of the blowing nozzle or mandrel about which the leading end of the tube is to be disposed and this entails that on closing of the mould there are produced about the neck excessive weld lines and the production of undue flashes, that is excess material which must later be removed.

The excessive weld lines are of source of weakness and the marks left after removal of the flashes detract from the appearance of the finished bottle and it is further found that when stiffer or stronger plastic material is being used, for example material such as the so-called high density polyethylene, the excessive flashes are often very difficult to remove, especially by the use of automatic or semi-automatic processes.

A still further disadvantage of the upside-down method resides in the necessity of properly locating the leading end of the tube about the blowing nozzle or mandrel. This is complicated by the need to ensure that the inner diameter of the tube be as small as possible to reduce the extent of any flash formed and the clearance between the interior of the tube and the nozzle or mandrel is therefore at a minimum. Thus if, as sometimes happens, the extruded tube is not accurately aligned with the nozzle or mandrel the latter does not properly enter the tube so that the tube cannot be expanded to the shape of the mould and becomes scrap.

In another currently employed method of manufacturing bottles from plastic material, known as an "upright" method, a sectional mould is mounted on a stationary mould support located beneath an extrusion die through which a plastic tube is extruded in a vertical downward direction. The mould sections are movable laterally relative to the support to permit the mould to be opened or closed and when a tube of requisite length has been extruded the mould is closed, the leading end of the tube being clamped between the lower ends of the mould sections to form the bottom of the bottle while the upper end of the tube is clamped between the upper ends of the mould sections and a blowing tube which extends through the extrusion die and into the mould, the plastic tube having been extruded round the blowing tube. When a length of plastic tube is enclosed in the mould fluid, normally air, under pressure is introduced into the plastic tube through the blowing tube to expand the plastic tube to the shape of the interior of the mould. By this method the neck of the bottle is formed about the blowing tube at the upper end of the mould.

When manufacturing bottles by the "upright" method the disadvantages of the "upside-down" method mentioned above are avoided but it is necessary to interrupt the formation of the tube during the expansion of a tube portion enclosed in the mould and the removal of the formed bottle from the mould and this, it will be readily understood, considerably curtails the rate of output of the apparatus because following the closing of the mould extrusion cannot be re-started until after the formed bottle is removed from the mould, and the mould cannot be again closed until the required length of tube has been extruded.

It is a main object of the present invention to provide apparatus for manufacturing hollow articles from plastic material which by using an "upright" method avoids the disadvantages inherent in the "upside-down" method and permits the production of good quality articles at a rate which renders the production thereof less costly than those obtainable by the known upright and upside-down methods. A further object is to provide apparatus which is relatively cheap to manufacture and service.

According to the invention there is provided apparatus for forming hollow articles of plastic material in which the leading end portion of a tube of molten plastic material is extruded continuously in a vertical downward direction and the leading end portion is expanded to the shape of the interior of a sectional mould which encloses the leading end portion and is reciprocable along the axes of extrusion to and from a datum position thereof which is remote from the position of extrusion and at which the mould is opened to permit removal of a formed article therefrom, characterised by severing from the parent tube the leading end portion which is enclosed in the mould and while the mould is returning to the datum position thereof introducing a nozzle into that end of the enclosed tube length which is nearest the position of extrusion thereby to effect an airtight seal between the tube and the upper end of the closed mould, and introducing fluid under pressure through the nozzle to effect expansion of the tube portion to conform it to the shape of the interior of the closed mould.

Further according to the invention there is provided apparatus for forming hollow articles of plastic material by continuously extruding a tube of molten plastic material in a vertical downward direction, disposing the sections of a sectional mould about the axis of extrusion, spacing the mould sections apart laterally of said axis while in a datum position thereof remote from the position of extrusion, moving the spaced mould sections from said datum position lengthwise of said axis to a closing position adjacent to the position of extrusion and in the closing position thereof moving the mould sections towards said axis to effect closing of the mould about a length of extruded tube in a manner such that the free end of the tube is closed and clamped between the bottom portions of the mould and the upper end thereof embraces the tube while leaving open the throughway of the tube, severing the enclosed tube length to conform it to the shape of the interior of the mould while returning the closed mould to the datum position thereof by inserting a blowing nozzle into the open end of the enclosed tube length in a manner such as to effect an airtight seal between the upper end of the tube length and the mould and by introducing fluid under pressure through the nozzle, and in the datum position thereof moving the mould sections laterally away from said axis to effect opening of the mould and to permit the removal therefrom of the article formed therein.

Further according to the invention there is provided apparatus for forming hollow articles of plastic material comprising the combination with an extrusion die through which a tube of molten plastic material can be extruded continuously in a vertical downward direction and means operable in close proximity with the die to cut a length from the parent tube, of a mould support reciprocable lengthwise of the axis of extrusion, mould sections disposed about said axis and mounted on said support for movement laterally relative thereto to permit opening and closing of the mould and for movement therewith between a datum position at which the mould is remote from the die and a mould-closing position adjacent to the die, a blowing nozzle movable with said support and relative to the upper end of the mould to and from a position in which it is arranged to co-operate with the upper end of the closed mould to form an airtight seal between the mould and the upper end of a length of extruded tube severed from the parent tube and gripped between the upper and lower ends of the mold and to permit fluid under pressure to be admitted to the tube length to expand it and conform it to the shape of the interior of the mould, and operating means operable to effect co-operation of the blowing nozzle with the mould during movement of the mould towards said datum position.

Figure 5:
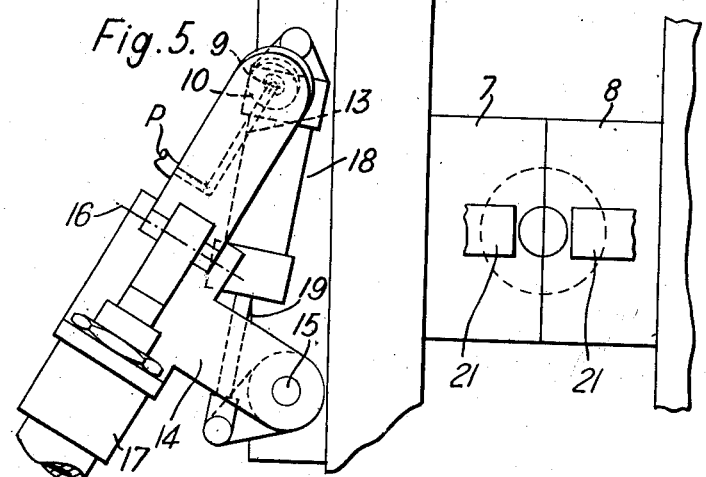
Figure 6:
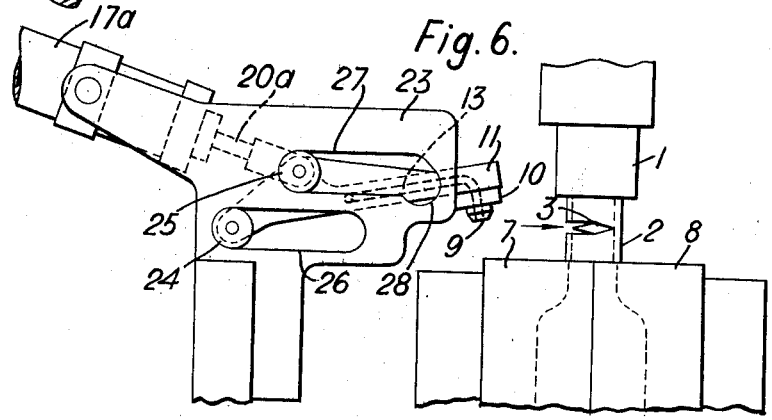
Figure 10:
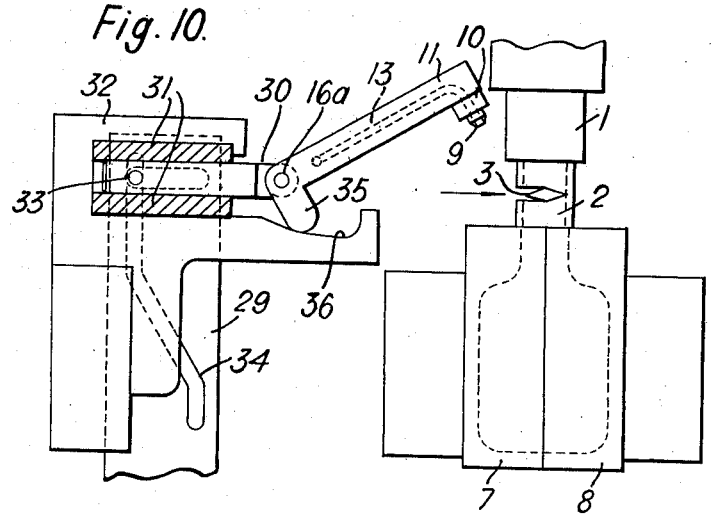
Figure 11:
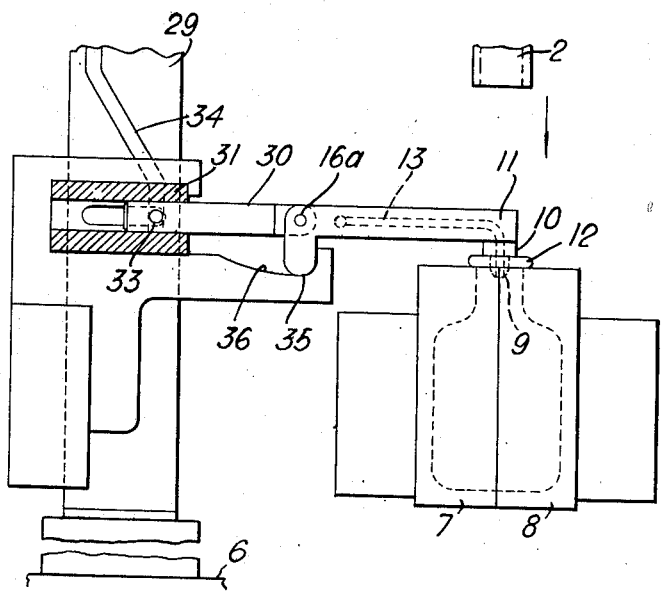
Figure 12:
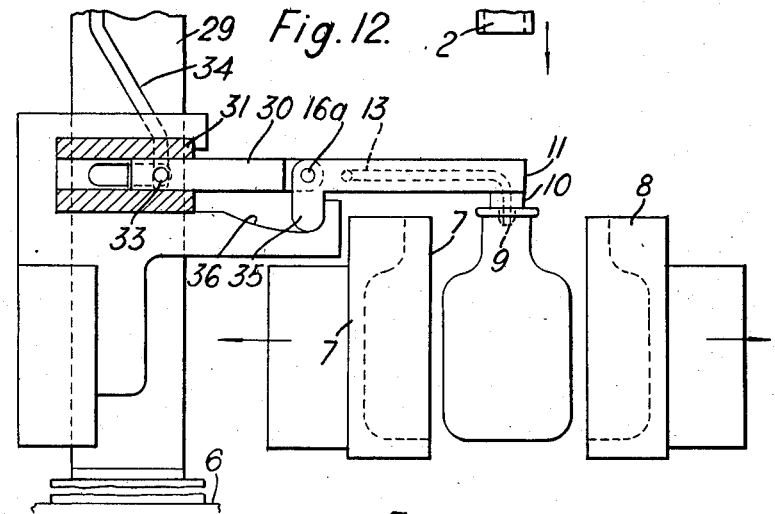
Figure 13:
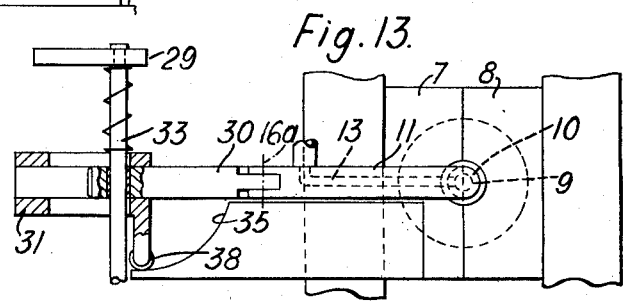
Figure 14:
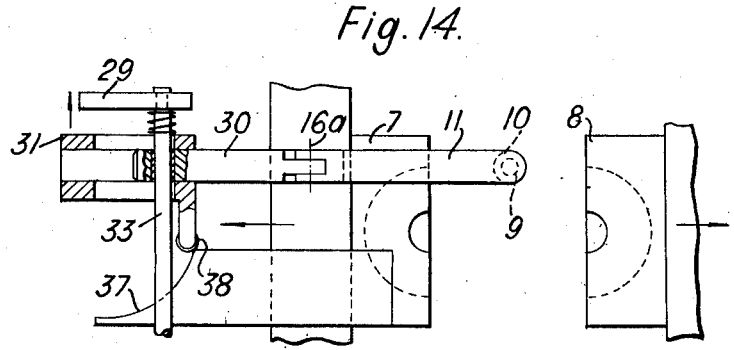

In order that the invention may be clearly understood some embodiments thereof will now be described, by way of example, with reference to the accompanying diagrammatic drawings, in which:

FIG. 1 diagrammatically illustrates one form of apparatus according to the invention with a sectional mould in the datum position thereof relative to an extrusion die, FIG. 2 diagrammatically illustrates a part of the apparatus shown in FIG. 1 but with the parts illustrated in the positions occupied thereby when a tube length is being severed from a parent extruded tube, FIG. 3 illustrates diagrammatically the insertion of a blowing nozzle into the upper end of a tube length enclosed in a closed mould, FIG. 4 illustrates diagrammatically the mould in the datum position thereof during removal of a bottle therefrom, FIG. 5 is a diagrammatic top plan of FIG. 2 with the extrusion die omitted for clarity, FIGS. 6 to 9 are views similar to FIGS. 2 to 5 respectively, but illustrate a modified form of blowing nozzle operating mechanism, FIGS. 10 to 12 are views similar to FIGS. 2, 3 and 4, respectively, but illustrate a further form of alternative blowing nozzle operating mechanism, and FIGS. 13 and 14 are plan views illustrating a mode of removal of a bottle from a mould.

In the drawings like references refer to like or similar parts.

In the following description it will be assumed that the hollow articles being manufactured are bottles made from plastic material.

Referring to FIGS. 1 to 5, the apparatus comprises an extrusion die 1 such as is used in known forms of apparatus for carrying out an "upside-down" method and through which a tube 2 of molten plastic is extruded continuously in a vertical downward direction. A knife 3, FIG. 2, is operable, in known manner, in close proximity with the die 1 to cut a length of extruded tube from the parent tube. Below the extrusion die 1 a mould support 4, FIG. 1, is carried by vertical rods 5 supported for reciprocation in a machine bed 6 in the manner customary in apparatus for carrying out an "upside-down" method. The mould support 4 is reciprocable lengthwise of the axis of extrusion and carried by the mould support 4 are the two halves 7, 8 of a sectional mould. The mould sections 7, 8 are disposed about the axis of extrusion and are mounted on the mould support 4 for movement laterally relative thereto, in the manner customary in apparatus for carrying out an "upside-down" method, to permit opening and closing of the mould. The mould sections 7, 8 are movable with the mould support 4 between a datum position, illustrated in FIG. 1, at which the mould is remote from the extrusion die 1 and a mould closing position, indicated in dotted lines in FIG. 1, adjacent to the die. At the beginning of a bottle-forming cycle, the mould support 4, on which the mould sections 7, 8 are in the fully open condition thereof, is raised to the mould closing position indicated in dotted lines in FIG. 1 and, due to the continuous extrusion of the tube 2, when the mould reaches the closing position thereof there is disposed between the open mould sections 7 and 8 a sufficient length of tube to extend slightly below the bottom of the mould. The mould sections 7, 8 are then, in known manner, closed about the length of tube in a manner such that the free or leading end of the tube is gripped between the lower ends of the mould sections and is closed thereby to form the bottom of the bottle and the upper ends of the mould sections grip the tube 2 in a manner such as to leave open the through passage of the tube. The knife 3 is then operated to sever the enclosed tube length from the parent tube. Immediately following the severing of the tube the mould support 4 commences its return, that is downward, movement at a linear speed greater than that at which the tube is extruded thereby to space the severed length from the parent tube and to restore the mould to the datum position thereof and during this downward movement of the mould a blowing nozzle 9, FIG. 3, is caused to co-operate with the upper end of the closed mould in a manner such that it enters the open end of the tube length at the upper end of the mould. The nozzle 9 extends from a shoulder portion 10 supported by a carrier 11 and the shoulder portion 10 compresses that portion of the tube length which extends above the upper end of the enclosed mould, see FIG. 2, against the upper end of the closed mould to form a flash 12 which, in turn forms an airtight seal between the mould and the upper end of the tube length contained in the mould. As indicated in FIG. 3 the carrier 11 is provided with a throughway 13 which is connected by a tubular pipe P, FIG. 5, with a source of fluid pressure, preferably compressed air, not shown. When the blowing nozzle has been moved to the position thereof illustrated in full lines in FIG. 3 compressed air is introduced through the blowing nozzle into the tube length contained in the mould and causes the tube length to be expanded to conform it to the shape of the interior of the mould.

The blowing nozzle is supported for movement towards and away from the axis of extrusion to permit movement of the nozzle into and out of the path of the parent tube and the nozzle is also supported for pivotal movement into and out of co-operation with the upper end of the tube length gripped by the closed mould. In the embodiment of the invention illustrated in FIGS. 2 to 5 the blowing nozzle is rockable with a rocking arm 14 about a first pivotal axis 15 which is parallel to the axis of extrusion but spaced therefrom. The blowing nozzle is also rockable about a second pivot 16 carried by the rocking arm 14, the axis of the pivot being located in a plane at right angles to the plane of the first pivotal axis 15.

The operating means for the blowing nozzle includes actuating devices operating respectively to effect rocking of the nozzle about the first and second pivotal axes thereof and in the embodiment of the invention illustrated in FIGS. 2 to 5 the actuating devices comprise air cylinders 17, 18 which include piston rods 19, FIG. 5, and 20, FIG. 3, connected respectively to the rocking arm 14 and to the carrier 11. The air cylinders are actuated in known manner by mechanism, not shown, so that they operate in a manner such that the rocking arm 14 is rotated about the first pivotal axis 15 to move the blowing nozzle into the path of the tube being extruded, but at a time when it will not interfere with the downward movement of the tube being extruded. Actuation of the air cylinder 17 causes the blowing nozzle 9 to be rocked downwards, as illustrated in FIG. 3, to enter the upper end of the tube length within the mould and to effect sealing thereof in the manner described above. The compressed air is admitted to the tube immediately the air-tight seal has been effected at the top of the mould and expansion of the tube length to conform it to the shape of the interior of the mould occurs almost instantaneously so that during the last part of the downward movement of the mould to the datum position thereof the formed bottle commences to cool. On return of the mould to the datum position, and at the end of a predetermined interval of time to ensure setting of the bottle, the blowing nozzle is restored to the inactive position thereof, as illustrated in FIGS. 2, 4 and 5, and the mould is opened, in known manner, so that the formed bottle can be removed therefrom.

Stripper fingers 21, FIG. 4, carried on supports 22 secured to the mould support 4, located in close proximity with the flash 12, prevent the formed bottle from adhering to one or other of the mould sections during opening of the mould so that on complete opening of the mould the bottle can fall away from the mould. Only one of the supports 22 is illustrated in FIG. 4.

Referring to FIGURES 6 to 9, the apparatus diagrammatically illustrated therein operates in a manner similar to that described above with reference to FIGURES 1 to 5, but the operating means for the blowing nozzle differ from those described above. In FIGURES 6 to 9 the movements of the blowing nozzle 9 are controlled by cams 23 which are fixed to the mould support 4 for movement therewith and operating means, illustrated as an air cylinder 17a, is operable to effect movement of the nozzle relative to the cam. The nozzle carrier 11 is provided with cam follower rollers 24, 25 located respectively in tracks 26, 27 of cams 23. The carrier 11 is connected with the air cylinder through a piston rod 20a. On operation of the air cylinder, during downward movement of the mould to the datum position, the carrier is moved towards the axis of extrusion, being guided by the cam tracks 26, 29, until the nozzle 9 is located in the path of extrusion of the tube, but below the leading end of the tube as illustrated in FIGURE 7, and as the roller 25 approaches the end of track 27 it is moved into the down-turned portion 29 of the track thus causing the carrier to pivot about the axis of roller 24 and the nozzle 9 to be inserted into the open upper end of the tube in the mould as illustrated in full line in FIGURE 7.

In this embodiment of the invention the nozzle is caused to remain inserted in the upper end of the formed article, as illustrated in FIGURE 8, until the mould sections, when in the datum position, have been moved to the open positions thereof thereby to ensure separation of the formed bottle from the mould and, following opening of the mould, air is blown through the nozzle to eject the bottle from the nozzle.

FIGURES 10 to 14 illustrate a still further alternative operating means for the blowing nozzle 9 and in this embodiment of the invention the nozzle 9 is supported by the carrier 11 for rocking movement into co-operation with the upper open end of a tube length gripped by the closed mould, the rocking movement being effected about a pivotal axis 16a at right angles to the axis of extrusion. The carrier 11 is reciprocable towards and away from the axis of extrusion in a direction at right angles thereto to effect movement of the blowing nozzle into and out of the path of the parent tube. The carrier 11 is supported for movement with the mould support 4 and co-operates with a stationary cam 29 disposed alongside the path of support 4 and arranged to effect reciprocation of the carrier. The pivotal axis 16a is the longitudinal axis of a pin carried by a slide 30 which is supported to be slidable lengthwise in a guide block 31 mounted in a housing 32 movable with the mould support 4. A pin 33 is carried by the slide 30 to be movable therewith and one end of the pin 33 is located in the track 34 of the cam 29. During downward movement of the mould to the datum position the pin 33 is moved downwards along the track 34 thereby moving the slide 30 to the right as viewed in FIGURES 10 to 12 and during this movement a tail 35 formed on the carrier 11 co-operates with a nozzle-rocking cam 36, formed in extension of housing 32, so that the carrier 11 is rocked about is pivotal axis 16a to the position thereof shown in FIGURE 11 in which the nozzle 9 is entered into the open upper end of the tube length contained in the mould as described above.

In this embodiment of the invention the nozzle 9 is caused to remain located in the outer end of the formed article during opening of the mould in the datum position thereof, as is illustrated in FIGURES 12 to 14, and one mould section has mounted thereon for movement therewith a cam 37 which co-operates with a cam follower 38, FIGURES 13 and 14, carried by the guide block 31. The co-operation between cam 37 and roller 38 causes the carrier 11 to be moved laterally of the direction of opening of the mould and axially of pin 33 in a direction parallel with the axis 16a about which the carrier 11 is rocked, as illustrated in FIGURE 14, thereby ensuring removal of the formed article from the mould and, following the complete opening of the mould, air is directed through the nozzle 9 to eject the formed article from the nozzle. The lateral movement of the carrier 11 also displaces the carrier relative to the path of extrusion of the tube so that during the movement of the mould support 4 to the closing position of the mould the carrier 11 is displaced from the path of the length of tube 2 being extruded and by co-operation of the pin 33 with track 34 the carrier is restored to the position thereof shown in FIGURE 10, in preparation for the next downward movement of the closed mould.

In the foregoing description, the apparatus has been described as for use with a single extrusion die and mould. It will, however, be understood that, if desired, the extrusion machine may be provided with a number of extrusion dies 1 and the mould support 4 provided with a mould and associated blowing nozzle 9, as herein described, for co-operation with each of the extrusion dies. In one convenient form of such multiple bottle-forming machine the extrusion dies may be arranged in a line and the operating means for the blowing nozzles of alternate moulds arranged to be operated from opposite sides of the line.

We claim:

1. Apparatus for forming hollow articles of plastic material, comprising the combination with an extrusion die through which a tube of molten plastic material can be extruded continuously in a vertical downward direction and means operable in close proximity with the die to cut a length from the parent tube, of a mould support reciprocable lengthwise of the axis of extrusion, mould sections disposed about said axis and mounted on said support for movement laterally relative thereto to permit opening and closing of the mould and for movement therewith between a datum position at which the mould is remote from the die and a mould-closing position adjacent to the die, a rocking arm mounted on said support for pivotal movement about a first pivotal axis parallel to the axis of extrusion, a blowing nozzle connectable with a source of fluid under pressure and carried by said rocking arm for movement therewith and for movement relative thereto about a second pivotal axis located in a plane at right angles to the plane of said first pivotal axis, said nozzle being movable about said second axis to form an airtight seal between the mould and the upper end of a length of extruded tube severed from the parent tube and gripped between the upper and lower ends of the mould and to permit fluid under pressure to be admitted to the tube length to expand it and conform it to the shape of the interior of the mould, a first air cylinder and piston rod connected to the rocking arm to effect pivotal movement thereof about said first pivotal axis, and a second air cylinder and piston rod connected to said nozzle and operable in timed relation with said first air cylinder to effect rocking of the nozzle about said second pivotal axis.

2. Apparatus for forming hollow articles of plastic material, comprising the combination with an extrusion die through which a tube of molten plastic material can be extruded continuously in a vertical downward direction and means operable in close proximity with the die to cut a length from the parent tube, of a mould support reciprocable lengthwise of the axis of extrusion, mould sections disposed about said axis and mounted on said support for movement laterally relative thereto to permit opening and closing of the mould and for movement therewith between a datum position at which the mould is remote from the die and a mould-closing position adjacent to the die, a blowing nozzle connectable with a source of fluid under pressure and mounted on a nozzle carrier, rollers carried by said carrier and located respectively in superimposed tracks of cams mounted on said support for movement therewith, and an air cylinder and piston rod connected to said carrier and operable to effect movement of the carrier relative to the cams thereby to effect movement of the nozzle into and out of the path of extrusion and to effect rocking of the nozzle towards the upper end of the closed mould to form an airtight seal between the mould and the upper end of a length of extruded tube severed from the parent tube and gripped between the upper and lower ends of the mould and to permit fluid under pressure to be admitted to the tube length to expand it and conform it to the shape of the interior of the mould.

3. Apparatus for forming hollow articles of plastic material, comprising the combination with an extrusion die through which a tube of molten plastic material can be extruded continuously in a vertical downward direction and means operable in close proximity with the die to cut a length from the parent tube, of a mould support reciprocable lengthwise of the axis of extrusion, mould sections disposed about said axis and mounted on said support for movement laterally relative thereto to permit opening and closing of the mould and for movement therewith between a datum position at which the mould is remote from the die and a mould-closing position adjacent to the die, a blowing nozzle connectable with a source of fluid under pressure and mounted on a nozzle carrier, rollers carried by said carrier and located respectively in superimposed tracks of cams mounted on said support for movement therewith and to control movement of the nozzle into and out of the path of extrusion and rocking of the nozzle towards the upper end of the closed mould to form an airtight seal between the mould and the upper end of a length of extruded tube severed from the parent tube and enclosed in the mould, and operating means operable in timed relation with said support to effect said movements of the nozzle during movement of the mould towards said datum position.

4. Apparatus for forming hollow articles of plastic material, comprising the combination with an extrusion die through which a tube of molten plastic material can be extruded continuously in a vertical downward direction and means operable in close proximity with the die to cut a length from the parent tube, of a mould support reciprocable lengthwise of the axis of extrusion, mould sections disposed about said axis and mounted on said support for movement laterally relative thereto to permit opening and closing of the mould and for movement therewith between a datum position at which the mould is remote from the die and a mould-closing position adjacent to the die, a blowing nozzle connectable with a source of fluid under pressure and mounted on a nozzle carrier carried by said support for reciprocating movement relative thereto towards and away from the axis of extrusion thereby to move the nozzle into and out of the path of extrusion, a slide supporting said carrier for reciprocation relative to the support and for pivotal movement about a pivotal axis at right angles to the axis of extrusion, a first cam co-operating with said slide to effect reciprocation thereof, and a second cam to effect rocking of the carrier about said pivotal axis relative to the upper end of the mould to and from a position at which the nozzle is arranged to co-operate with the upper end of the closed mould to form an airtight seal between the mould and the upper end of a length of extruded tube severed from the parent tube and gripped between the upper and lower ends of the mould and to permit fluid under pressure to be admitted to the tube length to expand it and conform it to the shape of the interior of the mould.

5. Apparatus for forming hollow articles of plastic material, comprising the combination with an extrusion die through which a tube of molten plastic material can be extruded continuously in a vertical downward direction and means operable in close proximity with the die to cut a length from the parent tube, of a mould support reciprocable lengthwise of the axis of extrusion, mould sections disposed about said axis and mounted on said support for movement laterally relative thereto to permit opening and closing of the mould and for movement therewith between a datum position at which the mould is remote from the die and a mould-closing position adjacent to the die, a blowing nozzle connectable with a source of fluid under pressure and mounted on a nozzle carrier movable and relative to said support, a stationary cam co-operating with said carrier to effect movement of the nozzle into and out of the path of extrusion, and a nozzle-rocking cam movable with said support and co-operating with the nozzle carrier to effect rocking of the nozzle relative to the upper end of the mould to and from a position at which the nozzle is arranged to co-operate with the upper end of the closed mould to form an airtight seal between the mould and the upper end of a length of extruded tube severed from the parent tube and gripped between the upper and lower ends of the mould to permit fluid under pressure to be admitted to the tube length to expand it and conform it to the shape of the interior of the mould.

6. Apparatus according to claim 5, wherein the slide is mounted in a guide block carried by said support for movement relative to the support in a direction parallel to the pivotal axis of the carrier, and including a cam co-operating with the guide block and movable with one of said mould sections whereby on opening of the mould in the datum position thereof an article engaged by the blowing nozzle is moved by the nozzle laterally of the direction of opening of the mould to effect separation of the article from the mould.

References Cited in the file of this patent

UNITED STATES PATENTS

| | | |
|---|---|---|
| 2,898,633 | Burch | Aug. 11, 1959 |
| 2,943,349 | Adams et al. | July 5, 1960 |
| 2,952,034 | Fortner | Sept. 13, 1960 |
| 2,964,795 | Schaich | Dec. 20, 1960 |
| 2,975,473 | Hagen et al. | Mar. 21, 1961 |
| 2,978,745 | Langecker | Apr. 11, 1961 |